(12) United States Patent
Zhang et al.

(10) Patent No.: US 10,713,533 B2
(45) Date of Patent: Jul. 14, 2020

(54) IMAGE PROCESSING METHOD AND APPARATUS, AND COMPUTER-READABLE STORAGE MEDIUM

(71) Applicant: MEGVII (BEIJING) TECHNOLOGY CO., LTD., Beijing (CN)

(72) Inventors: Xiangyu Zhang, Beijing (CN); Yihui He, Beijing (CN)

(73) Assignee: MEGVII (BEIJING) TECHNOLOGY CO., LTD., Beijing (CN)

(*) Notice: Subject to any disclaimer, the term of this patent is extended or adjusted under 35 U.S.C. 154(b) by 90 days.

(21) Appl. No.: 16/034,183

(22) Filed: Jul. 12, 2018

(65) Prior Publication Data

US 2019/0294928 A1    Sep. 26, 2019

(30) Foreign Application Priority Data

Mar. 21, 2018   (CN) .......................... 2018 1 0236351

(51) Int. Cl.
*G06K 9/62*    (2006.01)
(52) U.S. Cl.
CPC ......... *G06K 9/6262* (2013.01); *G06K 9/6267* (2013.01)
(58) Field of Classification Search
None
See application file for complete search history.

(56) References Cited

U.S. PATENT DOCUMENTS 9,495,378 B2 * 11/2016 Sundaram ............ G06F 16/1744
9,524,450 B2 * 12/2016 Ravindran ............ G06K 9/6292
2016/0104056 A1 * 4/2016 He ....................... G06K 9/66
                                                                    382/158
2016/0342888 A1 * 11/2016 Yang .................. G06K 9/00986
2019/0311249 A1 * 10/2019 Zhang ..................... G06F 17/15

OTHER PUBLICATIONS

He et al., "Channel Pruning for Accelerating Very Deep Neural Networks", Cornell University Library (Computer Science, Computer Vision and Pattern Recognition), Aug. 21, 2017, 10 pages; available at https://arxiv.org/pdf/1707.06168.pdf.

* cited by examiner

*Primary Examiner* — Iman K Kholdebarin
(74) *Attorney, Agent, or Firm* — Hamre, Schumann, Mueller & Larson, P.C.

(57) ABSTRACT

Provided are neural network-based image processing method and apparatus, and a computer-readable storage medium. The image processing method includes: inputting an image into an optimized neural network; extracting, by the optimized neural network, image features of the image; and outputting the image features, wherein the optimized neural network is obtained by performing a first optimization process on at least one sub-layer in a pre-trained initial neural network, each sub-layer of the at least one sub-layer includes a convolutional layer, and the first optimization process comprises: for each sub-layer of the at least one sub-layer, determining one or more channels to be removed from a filter of the convolutional layer and removing said one or more channels, and optimizing parameters of remaining channels in the filter of the convolutional layer, so that error of output features of each optimized sub-layer is minimized.

19 Claims, 7 Drawing Sheets

IMAGE PROCESSING METHOD AND APPARATUS, AND COMPUTER-READABLE STORAGE MEDIUM

CROSS-REFERENCE TO RELATED APPLICATIONS

The present application claims priority of the Chinese Patent Application No. 201810236351.0 filed on Mar. 21, 2018, the entire disclosure of which is hereby incorporated in full text by reference.

TECHNICAL FIELD

The present disclosure relates to the technical field of image processing, and more particularly, to a neural network-based image processing method and apparatus, and a computer-readable storage medium.

BACKGROUND

Neural network is a large-scale multi-parameter optimization tool. With a large amount of training data, neural network can learn hidden features that are difficult to summarize in the data, thus completing many complex tasks, such as face detection, image semantic segmentation, object detection, motion tracking, and natural language translation. Neural network has been widely used in the artificial intelligence community.

In image processing applications such as modern deep visual recognition, the Convolutional Neural Network (CNN) model is at the core. However, since the convolutional network usually requires a huge amount of computation, the Convolutional Neural Network model must be simplified in order to be applied to application scenarios with low power consumption such as mobile devices. In the existing optimization schemes of Convolutional Neural Network used for image processing, some schemes only use information of the convolutional kernel itself without taking advantage of characteristics of input data distribution at each layer, some schemes use Stochastic Gradient Descent (SGD) that is instable in certain situations and has a risk of falling into a local extremum as the basic algorithm for optimization, some other schemes only use certain simple statistical information of channels (such as mean, variance, etc.) without considering interactive effects among channels, besides, some schemes require retraining on the optimized model, the optimization process is time-consuming and makes parameter tuning inconvenient. In other words, the existing schemes generally have the disadvantages of low optimization efficiency, serious loss of accuracy, and very limited speed-up ratio.

SUMMARY

In view of the above problem, the present disclosure is proposed. The present disclosure provides a neural network-based image processing method and apparatus, and a computer-readable storage medium.

According to an aspect of the present disclosure, there is provided an image processing method, comprising: inputting an image into an optimized neural network; extracting, by the optimized neural network, image features of the image; and outputting the image features, wherein the optimized neural network is obtained by performing a first optimization process on at least one sub-layer in a pre-trained initial neural network, each sub-layer of the at least one sub-layer includes a convolutional layer, and the first optimization process comprises: for each sub-layer of the at least one sub-layer, determining one or more channels to be removed from a filter of the convolutional layer and removing said one or more channels, and optimizing parameters of remaining channels in the filter of the convolutional layer, so that error of output features of each optimized sub-layer is minimized.

According to another aspect of the present disclosure, there is provided an image processing apparatus, comprising: an image input unit for inputting an image into an optimized neural network; an image feature extraction unit for extracting, by the optimized neural network, image features of the image; and an image feature output unit for outputting the image features, wherein the optimized neural network is obtained by performing a first optimization process on at least one sub-layer in a pre-trained initial neural network, each sub-layer of the at least one sub-layer includes a convolutional layer, and the first optimization process comprises: for each sub-layer of the at least one sub-layer, determining one or more channels to be removed from a filter of the convolutional layer and removing said one or more channels, and optimizing parameters of remaining channels in the filter of the convolutional layer, so that error of output features of each optimized sub-layer is minimized.

According to another aspect of the present disclosure, there is provided an image processing apparatus, comprising: a memory for storing non-transient computer-readable instructions; and a processor for executing the computer-readable instructions to cause the image processing apparatus to perform the image processing method described above.

According to still another aspect of the present disclosure, there is provided a computer-readable storage medium for storing computer-readable instructions capable of, when being executed by a computer, causing the computer to perform the image processing method described above. For example, the computer-readable storage medium is a non-transient computer-readable storage medium.

As will be described in detail below, the neural network-based image processing method and apparatus according to the embodiments of the present disclosure perform channel optimization on a neural network for application scenarios with low power consumption such as mobile devices. The objective of the optimization process according to the embodiments of the present disclosure is to minimize the error on feature reconstruction of each sub-layer, rather than the error on reconstruction of the convolutional kernel, thereby the input feature distribution of each sub-layer and the information of the convolutional kernel itself are considered concurrently.

It is to be understood that both the foregoing general descriptions and the following detailed descriptions are exemplary and intended to provide further explanations of the claimed technique.

BRIEF DESCRIPTION OF THE DRAWINGS

Through the more detailed descriptions of embodiments of the present disclosure that are provided with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodi

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are part of the embodiments of the present disclosure, rather than all of the embodiments of the present disclosure, it should be understood that the present disclosure is not limited to the exemplary embodiments described herein.

The present disclosure relates to a neural network-based image processing method and apparatus. Usually, the image processing method using neural network can be divided into two phases, namely, a training phase and an image processing phase. The so-called training phase refers to that first it needs to use training images to train the neural network, so as to adjust weights (also referred to as parameters) of the neural network; the so-called image processing phase refers to that features of an image to be processed are extracted by using the trained neural network afterwards. In the present disclosure, in order to apply the Convolutional Neural Network model to application scenarios with low power consumption such as mobile devices, an optimization process is further performed on the trained convolutional neural network, and the optimized convolutional neural network is used for image processing such as feature extraction. Hereinafter, various embodiments of the present disclosure will be described in detail with reference to the accompanying drawings.

Figure 1:
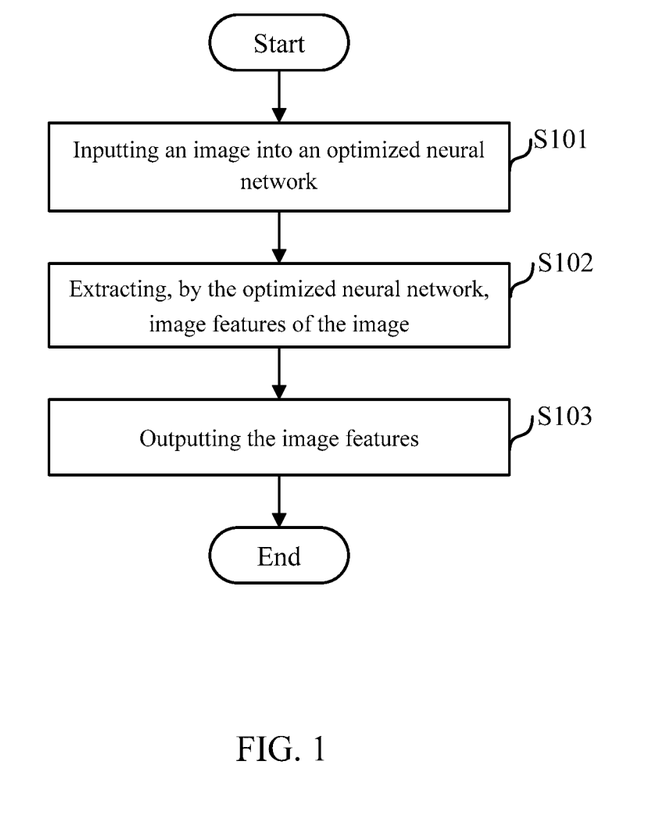
- FIG. 1 is a flowchart illustrating an image processing method according to an embodiment of the present disclosure.

First, an image processing method according to an embodiment of the present disclosure is described with reference to FIGS. 1 and 2. FIG. 1 is a flowchart illustrating an image processing method according to an embodiment of the present disclosure, and FIG. 2 is a schematic diagram illustrating an image processing method according to an embodiment of the present disclosure.

Figure 2:
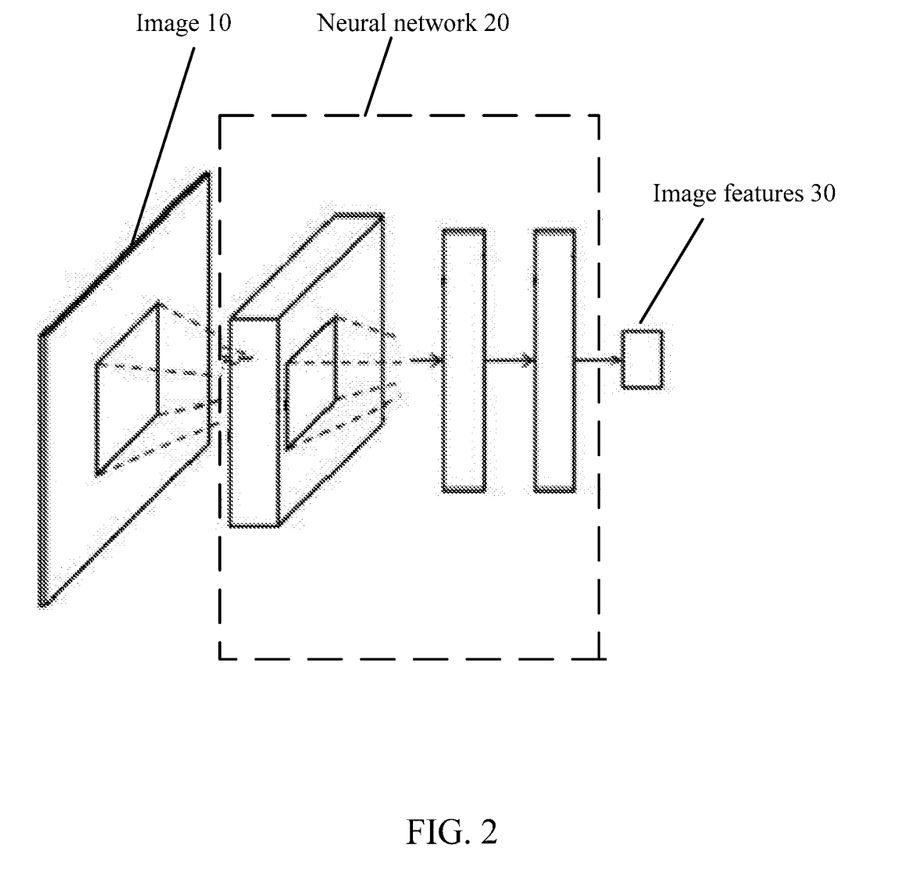
FIG. 2 is a schematic diagram illustrating an image processing method according to an embodiment of the present disclosure.

As shown in FIGS. 1 and 2, in step S101, an image 10 is inputted into an optimized neural network 20.

In step S102, the optimized neural network 20 extracts image features 30 of the image 10. As schematically shown in FIG. 2, the optimized neural network 20 includes a plurality of sub-layers cascaded, including but not limited to, a convolutional layer, a pooling layer, an activation layer, a fully-connected layer, and the like.

In step S103, the image features 30 are outputted. The image features 30 may be further used for target object detection and segmentation, target object classification, and target object motion prediction in the inputted image 10.

Figure 3:
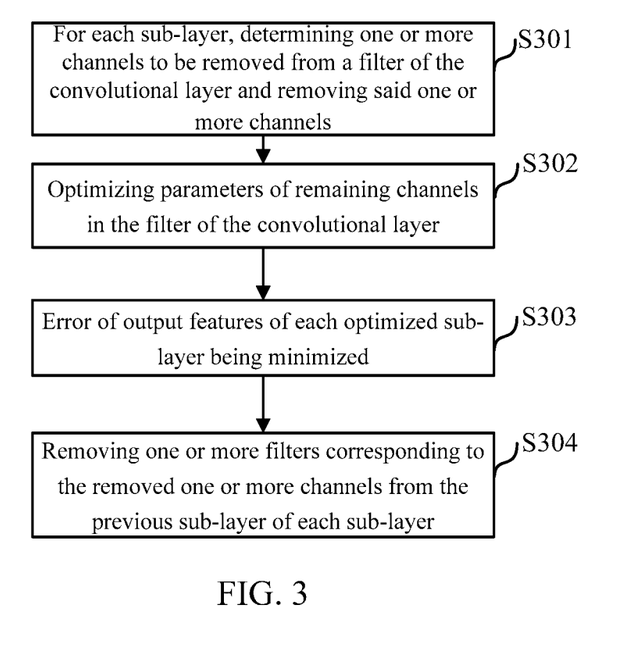
FIG. 3 is a flowchart illustrating an optimization process on a convolutional neural network in an image processing method according to an embodiment of the present disclosure.
Figure 4:
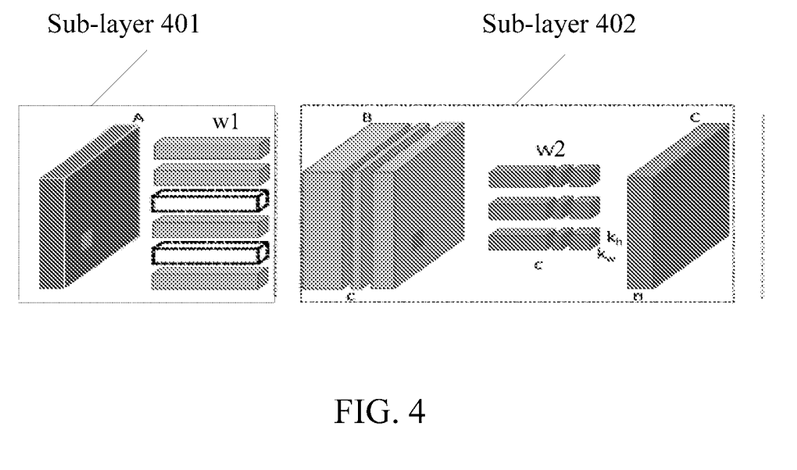
FIG. 4 is a schematic diagram illustrating an optimization process on a convolutional neural network in an image processing method according to an embodiment of the present disclosure.

As described above, in the image processing method according to an embodiment of the present disclosure, in order to apply the Convolutional Neural Network model to application scenarios with low power consumption such as mobile devices, an optimized convolutional neural network is used. Hereinafter, an optimization process on a convolutional neural network in an image processing method according to an embodiment of the present disclosure will be described with reference to FIGS. 3 and 4. FIG. 3 is a flowchart illustrating an optimization process on a convolutional neural network in an image processing method according to an embodiment of the present disclosure; FIG. 4 is a schematic diagram illustrating an optimization process on a convolutional neural network in an image processing method according to an embodiment of the present disclosure.

In step S301, for each sub-layer, one or more channels to be removed from a filter of the convolutional layer is determined and removed.

FIG. 4 schematically shows two sub-layers in a convolutional neural network to be optimized, namely, a sub-layer 401 and a sub-layer 402. The sub-layer 402 is at least one sub-layer on which optimization process is to be performed in the convolutional neural network to be optimized. The sub-layer 401 and the sub-layer 402 each include a convolutional layer that convolves feature maps A and B using their respective filters w1 and w2, separately. Prior to performing optimization on the sub-layer 402, in the trained initial neural network, an output feature map B generated after performing convolutional computation on the feature map A by the filter w1 in the sub-layer 401 is used as an input feature map of the sub-layer 402. A feature map C generated after convolutional computation is performed on the input feature map B by the filter w2 in the sub-layer 402 is an output feature map of the sub-layer 402.

Further, as shown in the sub-layer 402 in FIG. 4, the original channel number c of the filter w2 in the sub-layer 402 is the same as the channel number c of the input feature map B of this layer. In addition, a filter kernel size of the filter w2 is $k_h \times k_w$, and the number of the filter w2 is n. In order to perform optimization on the sub-layer 402, it is necessary to select representative channels from among the c channels, and only the channels with the number of $c'(0 \leq c' \leq c)$ being retained to perform convolutional computation also can maintain enough information for image processing. As will be described in detail below, as for a single sub-layer, c' can be calculated from a desired speed-up ratio; as for the entire Convolutional Neural Network model, a speed-up ratio can be assigned to each sub-layer, and then c' for each sub-layer can be calculated. That is, as schematically shown in the sub-layer 402 in FIG. 4, after the one or more channels to be removed are determined, the filter w2 corresponding to the removed one or more channels and the corresponding one or more channels for the input feature map B (represented by missing portions of w2 and B in FIG. 4) will be removed and will not participate in the convolutional computation.

In step S302, parameters of remaining channels in the filter of the convolutional layer are optimized. Optimizing parameters of remaining channels in the filter of the convolutional layer is to adjust parameters of the i-th channel in the filter (1≤i≤c').

In step S303, error of output features of each optimized sub-layer is minimized. After the one or more channels are removed from the sub-layer 402, output features of the optimized c' channels are reconstructed, if the error between the optimized output features and the original output features that are not optimized of this sub-layer is smallest, then it indicates that the representative channels selected at this time satisfy the optimization conditions. That is, in the optimization process according to the present disclosure, the optimization goal is to minimize the error on feature reconstruction of the sub-layer, rather than the error on reconstruction of the convolutional kernel, thereby the input feature distribution of each sub-layer and the information of the convolutional kernel itself are considered concurrently.

In step S304, one or more filters corresponding to the removed one or more channels from the previous sub-layer of each sub-layer is removed. As shown in FIG. 4, after the one or more channels are removed from the sub-layer 402, the one or more channels corresponding to the input feature map B also becomes unnecessary, so the one or more filters that generate the corresponding one or more channels of the input feature map B can be removed from the previous sub-layer 401, accordingly, an associated optimization is performed on the previous sub-layer 401.

Implementation of an optimization process on a convolutional neural network in an image processing method according to an embodiment of the present disclosure described above with reference to FIGS. 3 and 4 will be described in further detail below.

Specifically, error minimization of output features after single-layer optimization being performed on the sub-layer 402 may be expressed by the following Expression (1):

$$\underset{\beta,W}{\mathrm{argmin}}\frac{1}{2N}\left\|Y-\sum_{i=1}^{c}\beta_i X_i W_i^T\right\|_F^2 \qquad \text{Expression (1)}$$

$$\|\beta\|_0 \le c'$$

where N represents the number of samples for optimization (i.e., a product of the number of random images used for optimization and the number of sample points on the image), Y represents original output features of the sub-layer 402 (i.e., the output features represented by the feature map C in FIG. 4), c represents the number of original channels for input features of the sub-layer 402, c' represents a predetermined threshold (i.e., the number of channels reserved after said optimization), β represents a mask vector for channel removing (respective components of β have values 0 and 1, wherein 0 means the channel is removed, 1 means the channel is reserved), $X_i$ represents an input feature on an i-th channel, and $W_i$ represents a parameter of the i-th channel in the filter, $\sum_{i=1}^{c}\beta_i X_i W_i^T$ in entirety represents output features of the sub-layer 402 after optimization.

In an embodiment, solving Expression (1) is equivalent to solving the following Expression (2):

$$\underset{\beta,W}{\mathrm{argmin}}\frac{1}{2N}\left\|Y-\sum_{i=1}^{c}\beta_i X_i W_i^T\right\|_F^2 + \lambda\|\beta\|_1 \qquad \text{Expression (2)}$$

$$\|\beta\|_0 \le c',\ \forall\ i\|W_i\|_F = 1$$

The physical meaning of each parameter in Expression (2) is the same as the corresponding parameter in Expression (1), respectively. In addition, compared with Expression (1), Expression (2) introduces a penalty coefficient λ representing a mask vector for channel removing. By increasing the penalty factor λ, there will be more 0 components in the mask vector β and more channels are removed to achieve a higher speed-up ratio. Compared with Expression (1), Expression (2) introduces a constrain $\forall i \|W_i\|_F=1$, thereby avoiding trivial solution.

Further, in an embodiment of the present disclosure, the one or more channels to be removed from the filter of the convolutional layer are determined based on the sparse least squares (such as LASSO) and removed; parameters of remaining channels in the filter of the convolutional layer are optimized by using the least squares, so that error of output features of each optimized sub-layer is minimized.

Specifically, the optimization process may be decomposed into the following two-step optimization process.

The first-step optimization corresponds to the above step S301, wherein the filter parameters of the respective channels are fixed and β is solved for channel selection. The β can be solved by the LASSO regression expressed by the following Expression (2)'.

$$\hat{\beta}^{LASSO}(\lambda) = \underset{\beta}{\mathrm{argmin}}\frac{1}{2N}\left\|Y-\sum_{i=1}^{c}\beta_i Z_i\right\|_F^2 + \lambda\|\beta\|_1 \qquad \text{Expression (2)'}$$

$$\|\beta\|_0 \le c'$$

where $Z_i = X_i W_i^T$ (size N×n), if $\beta_i=0$, then the corresponding channel is removed.

The second-step optimization corresponds to the above steps S302 and S303, wherein the β obtained in the first-step optimization is fixed, and the filter parameters $W_i$ of respective channels are solved to reconstruct the error. Specifically, parameters of remaining channels in the filter of the convolutional layer are optimized by using the least squares, so that error of output features of each optimized sub-layer is minimized. The least squares optimization is represented by the following Expression (3)'

$$\underset{W'}{\mathrm{argmin}}\|Y - X'(W')^T\|_F^2 \qquad \text{Expression (3)'}$$

where $X'=[\beta_1 X_1\ \beta_2 X_2 \ldots \beta_i X_i \ldots \beta_c X_c]$ (size N×c$k_h k_w$), W' is n×c$k_h k_w$ reshaped W, $W'=[W_1\ W_2 \ldots W_i \ldots W_c]$. After the result W' is obtained, it is reshaped back to W. It is assigned $\beta_i \to \beta_i \|W_i\|_F$, $W_i \to W_i/\|W_i\|_F$, thus the constrain condition $\forall i\|W_i\|_F=1$ in Expression (3)' is satisfied.

In an embodiment of the present disclosure, the first-step optimization and the second-step optimization are carried out alternatively. In the beginning, W is initialized from the trained neural network model, λ=0 (namely, no penalty) and $\|\beta\|_0$=c. Thereafter, λ is gradually increased, for each change of λ, the first-step optimization and the second-step optimization are iterated until $\|\beta\|_0$ is stable. After $\|\beta\|_0 \leq c'$ is satisfied, the final W is obtained from $\{\beta_i, W_i\}$.

In another embodiment of the present disclosure, in order to avoid the long optimization time consumed by iterative execution of the first-step optimization and the second-step optimization, the first-step optimization may be applied multiple times until $\|\beta\|_0 \leq c'$ is satisfied, then the second-step optimization is applied only once to get the final result.

In the above, the process of performing optimization on a single sub-layer including a convolutional layer in a convolutional neural network is described. The Convolutional Neural Network model currently applicable for image processing typically has a plurality of convolutional layers, large cumulative errors can be produced if the above-described optimization for a single sub-layer is applied for each of the plurality of convolutional layers. Therefore, in the case of performing optimization on the entire model, the optimized neural network is obtained after optimization process is performed on the plurality of sub-layers in the initial neural network model, and the error caused by optimization is obtained by computing based on the original output features of the convolutional layer and the output features of the optimized convolutional layer. In the case of performing optimization on the entire model, error minimization of the output features after each sub-layer in the entire Convolutional Neural Network model is optimized can be represented by the following Expression (4):

$$\underset{\beta, W}{\operatorname{argmin}} \frac{1}{2N} \left\| Y' - \sum_{i=1}^{c} \beta_i X_i W_i^T \right\|_F^2 \quad \text{Expression (4)}$$

$$\|\beta\|_0 \leq c'$$

where Y' is the output feature map of the sub-layer in the original neural network model, and the physical meanings of other parameters in Expression (4) are the same as the corresponding parameters in Expression (1), respectively.

Overall optimization on the Convolutional Neural Network model is described in the above, the above optimization manner can obtain sufficient ideal optimization effects for a single-path network model such as LeNet, AlexNet, and VGG. However, as for a multi-path network model such as GoogLeNet and ResNet networks, it is less than ideal.

Figure 5A:
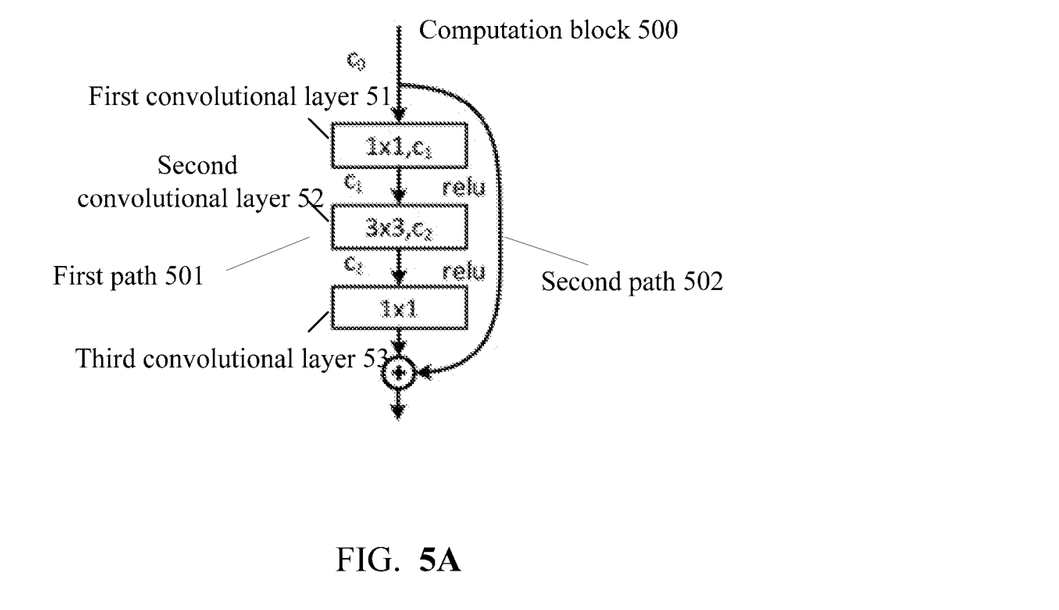
FIGS. 5A and 5B are schematic diagrams illustrating an optimization process on a multi-path neural network in an image processing method according to an embodiment of the present disclosure.

As shown in FIG. 5A, the multi-path neural network includes at least one computation block 500, wherein the computation block 500 includes a first path 501 and a second path 502, the first path includes a plurality of convolutional layers cascaded. In FIG. 5A, three convolutional layers having a spatial size of 1×1, 3×3, and 1×1 are shown, namely, a first convolutional layer 51, a second convolutional layer 52, and a third convolutional layer 53. The second path 502 is a path for linking input features of a first convolutional layer (i.e., the first convolutional layer 51) in the first path and output features of a last convolutional layer (i.e., the third convolutional layer 53) in the first path. Among the plurality of cascaded convolutional layers of the first path, the convolutional layers (i.e., the second convolutional layer 52) other than the first convolutional layer and the last convolutional layer can be optimized by adopting the optimization process described above. As for the first convolutional layer, it cannot be easily optimized, because its input feature map width is large, and the input feature map is shared with the second path. As for the last convolutional layer, it is difficult to recover the accumulated error from the second path because there is no parameter about the second path.

Figure 5B:
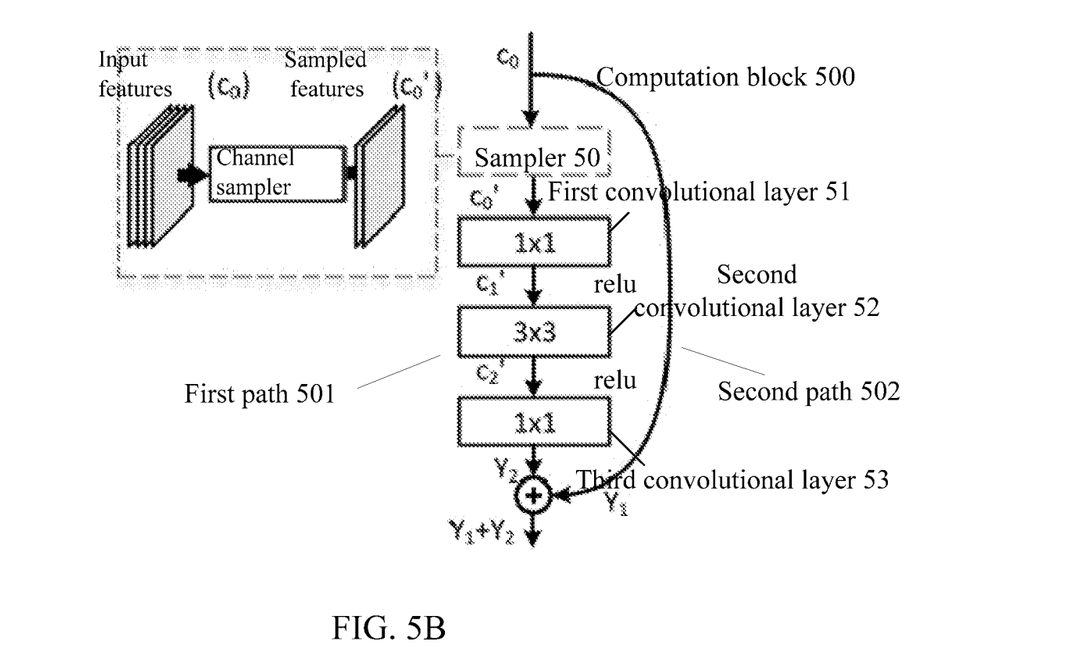

FIG. 5B is a schematic diagram that further illustrates an optimization process on the first convolutional layer and the last convolutional layer in the computation block for a multi-path neural network.

As shown in FIG. 5B, as for the first convolutional layer 51 of the computation block 500, since its input features are shared by the first path 501 and the second path 502, optimization cannot be performed by channel removing. In this case, a sampler 50 is set before the first convolutional layer 51 of the computation block 500, the sampler 50 is used to sample input features $c_0$ of the first path 501 of the computation block 500, thus obtaining sampled features $c_0'$, so that channels for the input features of the first convolutional layer 51 are filtered according to optimization needs, and meanwhile the input features $c_0$ entering the second path 502 are kept unchanged.

In addition, as shown in FIG. 5B, as for the third convolutional layer 53 of the computation block 500, the one or more channels to be removed from the filter of the third convolutional layer 53 is determined and removed, and parameters of remaining channels in the filter of the third convolutional layer 53 are optimized, to enable that error of the output features $Y_1+Y_2$ of the computation block 500 is minimized. In this case, $Y_1$ and $Y_2$ are the original output features of the first path 501 and the second path 502 before optimization, respectively. $Y_2$ can be approximated as in Expression (1), and the output features $Y_1$ of the second path 502 cannot be directly recovered, the optimization target of the third convolutional layer 53 is changed into $Y_1-Y_1'+Y_2$ from $Y_2$, where $Y_1'$ is the output features of the previous layer after optimization.

In the optimization process on the convolutional neural network as described above, the predetermined threshold c' which serves as the number of channels after optimization is one of the key parameters of the optimization process on the convolutional neural network in the image processing method according to an embodiment of the present disclosure, it directly decides the speed-up ratio and reconstruction error of the corresponding sub-layer. In an embodiment of the present disclosure, a quick search determination of the predetermined threshold c' is implemented without fine-tuning of the model.

Figure 6:
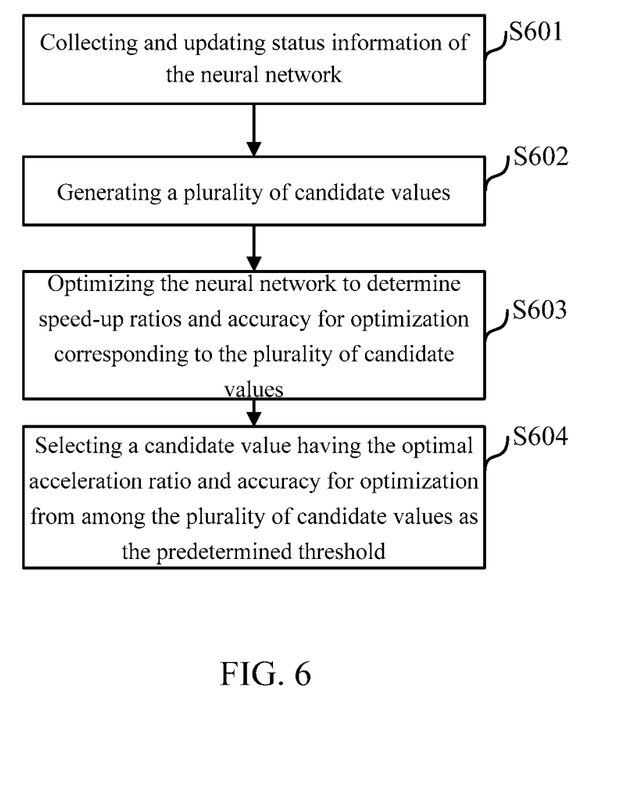
FIG. 6 is a flow chart illustrating determination of a predetermined threshold during an optimization process on a convolutional neural network in an image processing method according to an embodiment of the present disclosure.

FIG. 6 is a flow chart illustrating determination of a predetermined threshold during an optimization process on a convolutional neural network in an image processing method according to an embodiment of the present disclosure.

In step S601, status information of the neural network to the optimized are collected and updated. In an embodiment of the present disclosure, the status information includes the searched c' configuration, measured speed and accuracy, reconstruction error, and the like.

In step S602, a plurality of candidate values are generated. In an embodiment of the present disclosure, the plurality of candidate values may be determined directly by using, for example, reinforcement learning, genetic algorithm, or the like.

In step S603, the neural network is optimized to determine speedup ratios and accuracy for optimization corresponding to the plurality of candidate values. For the plurality of candidate values, candidate values with optimization speed-up ratio and accuracy that meet optimization requirements are selected.

In step S604, a candidate value having the optimal speed-up ratio and accuracy for optimization from among the plurality of candidate values is selected as the predetermined threshold.

The above described optimization process on the convolutional neural network in the image processing method according to an embodiment of the present disclosure is directed to the linear part of the convolutional neural network, while at present, most convolutional neural networks adopt the linear rectification function (ReLU) as a non-linear activation function, it is therefore necessary to further consider the influence of the non-linear part in the optimization process in order to improve performance of the optimization.

In the case where each sub-layer of the convolutional neural network to be optimized further includes a non-linear activation layer connected behind the convolutional layer, the optimization process is performed on each sub-layer, the one or more channels to be removed from the filter of the convolutional layer are determined and removed, and parameters of remaining channels in the filter of the convolutional layer are optimized, so that error of output features of the non-linear activation layer of each sub-layer optimized is minimized.

Specifically, error of output features of the non-linear activation layer of each sub-layer optimized is minimized, and the above Expression (1) can be adaptively shaped as the following Expression (5):

$$\operatorname*{argmin}_{\beta,W} \frac{1}{2N}\left\|f(Y) - f\left(\sum_{i=1}^{c}\beta_i X_i W_i^T\right)\right\|_F^2 \quad \text{Expression (5)}$$

$$\|\beta\|_0 \leq c'$$

The physical meanings of respective parameters in Expression (5) are the same as the corresponding parameters in Expression (1), respectively. In addition, in comparison to Expression (1), $f$ is introduced to represent a non-linear activation function.

Solving Expression (5) is equivalent to solving the following Expression (6):

$$\operatorname*{argmin}_{\beta,W} \frac{1}{2N}\left\|f(Y) - f\left(\sum_{i=1}^{c}\beta_i X_i W_i^T\right)\right\|_F^2 + \lambda\|\beta\|_1 \quad \text{Expression (6)}$$

$$\|\beta\|_0 \leq c', \forall i \|W_i\|_F = 1$$

Compared with Expression (2), the optimization formula here has a non-linear term additionally, and cannot be directly applied to the above two-step optimization method. In an embodiment of the present disclosure, Expression (6) is further relaxed:

$$\operatorname*{argmin}_{\beta,W,U} \frac{1}{2N}\|f(Y) - f(U)\|_F^2 + \quad \text{Expression (7)}$$

$$\frac{1}{2N}\delta\left\|U - \sum_{i=1}^{c}\beta_i X_i W_i^T\right\|_F^2 + \lambda\|\beta\|_1$$

$$\|\beta\|_0 \leq c', \forall i \|W_i\|_F = 1$$

When $\delta \to \infty$, $U=\Sigma_{i=1}^{c}\beta_i X_i W_i^T$, in this case, Expression (7) is equivalent to Expression (6).

In an embodiment of the present disclosure, a new two-step iterative optimization method is adopted to solve Expression (7).

In a first-step optimization, U is fixed, $\beta$, W are solved. That is, it is equivalent to optimize as follows:

$$\operatorname*{argmin}_{\beta,W} \frac{1}{2N}\delta\left\|U - \sum_{i=1}^{c}\beta_i X_i W_i^T\right\|_F^2 + \lambda\|\beta\|_1 \quad \text{Expression (8)}$$

$$\|\beta\|_0 \leq c', \forall i \|W_i\|_F = 1$$

There is no non-linear activation function in Expression (8). The two-step iterative optimization solution described with reference to FIGS. 3 and 4 can be used directly. And the one or more channels to be removed from the filter of each convolutional layer can be determined by fixing U and determining $\beta$ that satisfies Expression (8). In a second-step optimization, $\beta$, W are fixed, U is solved. That is, it is equivalent to optimize as follows:

$$\operatorname*{argmin}_{U} \frac{1}{2N}\delta\|f(Y) - f(U)\|_F^2 + \delta\|U - V\|_F^2 \quad \text{Expression (9)}$$

$$V = \sum_{i=1}^{c}\beta_i X_i W_i^T$$

It can be seen that V is a fixed value. Using the properties of the F norm, Expression (9) can be extended into:

$$\operatorname*{argmin}_{U} \sum_{i,j} |f(Y_{ij}) - f(U_{ij})|^2 + \delta|U_{ij} - V_{ij}|^2 \quad \text{Expression (10)}$$

where $Y_{ij}$ represents the i-th row and j-th column of the matrix Y.

Through the transformation, the multivariate optimization problem has become a series of unary function optimization problems, which greatly reduces difficulty of the problem. For example, when the non-linear activation $f$ is a ReLU function, the following closed-form solution can be obtained:

$$u_0 = \min(0, V_{ij})$$

$$u_1 = \max\left(0, \frac{\delta V_{ij} + f(Y_{ij})}{\delta + 1}\right)$$

$$U_{ij} = \operatorname*{argmin}_{u_0, u_1} |f(Y_{ij}) - f(U_{ij})|^2 + \delta|U_{ij} - V_{ij}|^2$$

By repeating the first-step optimization and the second-step optimization, the optimization on Expression (7) can be completed.

The image processing method according to an embodiment of the present disclosure has been described with reference to the drawings in the above, especially an optimization process on a convolutional neural network in an image processing method according to an embodiment of the present disclosure has been described with emphasis. Hereinafter, an image processing apparatus that performs this image processing method will be further described.

Figure 7:
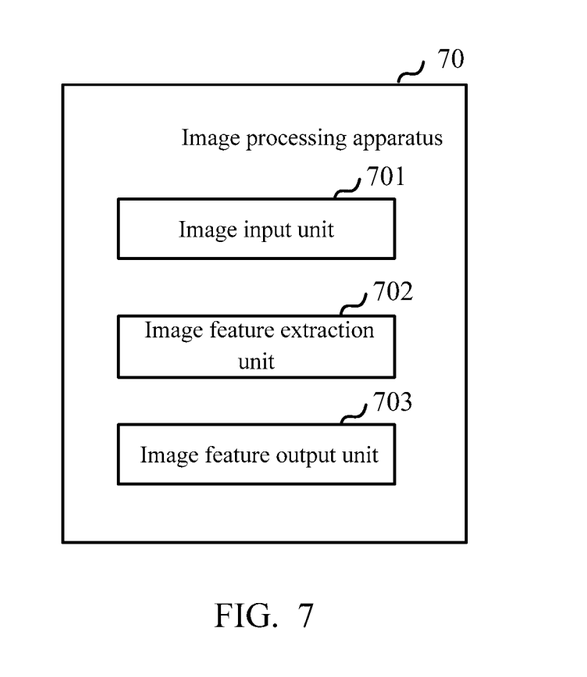
FIG. 7 is a block diagram illustrating an image processing apparatus according to an embodiment of the present disclosure.

FIG. 7 is a block diagram illustrating an image processing apparatus according to an embodiment of the present disclosure. The image processing apparatus 70 according to an embodiment of the present disclosure shown in FIG. 7 may be used to execute an image processing method according to an embodiment of the present disclosure as shown in FIG. 1. As shown in FIG. 5, an image processing apparatus 70 according to an embodiment of the present disclosure comprises an image input unit 701, an image feature extraction unit 702, and an image feature output unit 703.

Specifically, the image input unit 701 is for inputting an image into an optimized neural network. The image input unit 701 may be physically separated from the image feature extraction unit 702 and the image feature output unit 703 and the like in terms of position, and the image input unit 701 sends the input image to the other units in the image processing apparatus 70 via a wired or wireless manner. Alternatively, the image input unit 701 may be physically located in the same place or even within the same housing together with the other units or components in the image processing apparatus 70, and the other units or components in the image processing apparatus 70 receive, via the internal bus, the image sent by the image input unit 701.

In an embodiment of the present disclosure, the image input unit 701 may be a camera, and the image input unit 701 is specifically configured to acquire an image to be processed. In another embodiment of the present disclosure, the image input unit 701 is specifically configured to receive an image to be processed via a wired or wireless manner, for example, receive an image to be processed sent by an image capture device or other device. In another embodiment of the present disclosure, the image input unit 701 is specifically configured to obtain a pre-stored image to be processed from a memory.

The image feature extraction unit 702 is for extracting image features of the image through the optimized neural network. The optimized neural network utilized by the image feature extraction unit 702 includes a plurality of cascaded sub-layers, including but not limited to, a convolutional layer, a pooling layer, an activation layer, a fully-connected layer, and the like. The optimized neural network is obtained by performing optimization on the trained neural network by the optimization process described with reference to FIGS. 3 to 6.

The image feature output unit 703 is for outputting the image features. The image features may further be used for target object detection and segmentation, target object classification, and motion prediction of the target object in the input image.

Figure 8:
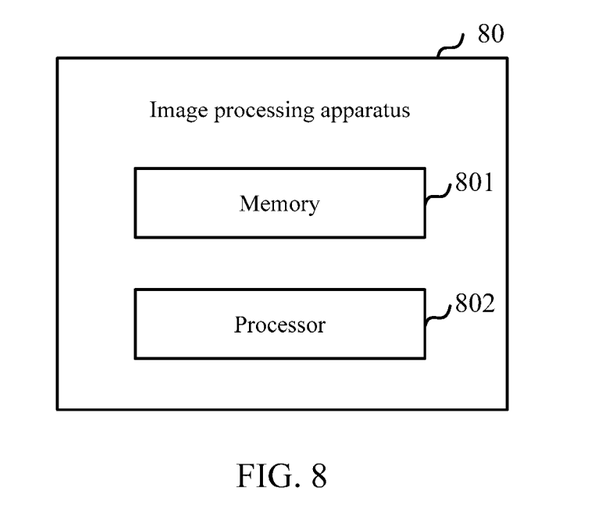
FIG. 8 is a hardware block diagram illustrating an image processing apparatus according to an embodiment of the present disclosure.

FIG. 8 is a hardware block diagram illustrating an image processing apparatus according to an embodiment of the present disclosure. As shown in FIG. 8, an image processing apparatus 80 according to an embodiment of the present disclosure includes a memory 801 and a processor 802. The respective components in the image processing apparatus 80 are interconnected by a bus system and/or other forms of connection mechanisms (not shown).

The memory 801 is for storing computer readable instructions. Specifically, the memory 801 may include one or more computer program products, the computer program product may include various forms of computer readable storage medium, such as volatile memory and/or non-volatile memory. The volatile memory may include, for example, random access memory (RAM) and/or cache. The non-volatile memory may include, for example, read only memory (ROM), hard disk, and flash memory.

The processor 802 may be a central processing unit (CPU), a graphical processing unit (GPU), or other forms of processing unit having data processing capability and/or instruction executing capability and also capable of controlling other components in the image processing apparatus 80 to execute intended functions. In an embodiment of the present disclosure, the processor 802 is configured to execute the computer-readable instructions stored in the memory 801 so that the image processing apparatus 80 executes a neural network-based image processing method. The image processing method is the same as that described with reference to FIGS. 1 and 2, and repeated description thereof will be omitted herein.

It is to be noted that, since the neural network model on which channel optimization has been performed is utilized in the image processing apparatus according to an embodiment of the present disclosure, the image processing apparatus according to an embodiment of the present disclosure may be electronic devices with low power consumption, such as a smartphone, a tablet, and a wearable electronic device.

In addition, it should be understood that, the components and structures of the image processing apparatus 80 shown in FIG. 8 are merely exemplary, rather than limitative. The image processing apparatus 80 may also have other components and structures as needed, for example, an image capture device and an output device, etc. (not shown). The image capture device may be used to acquire a to-be-processed image for image processing and store the captured image in the memory 801 for use by other components. Of course, the image to be processed may also be acquired by using other image acquisition devices, and the acquired image may be sent to the image processing apparatus 80, and the image processing apparatus 80 may store the received image in the memory 801. The output device may output various types of information such as image information and image processing results to the outside (e.g., the user). The output device may include one or more of a display, a speaker, a projector, a network card, or the like.

Figure 9:
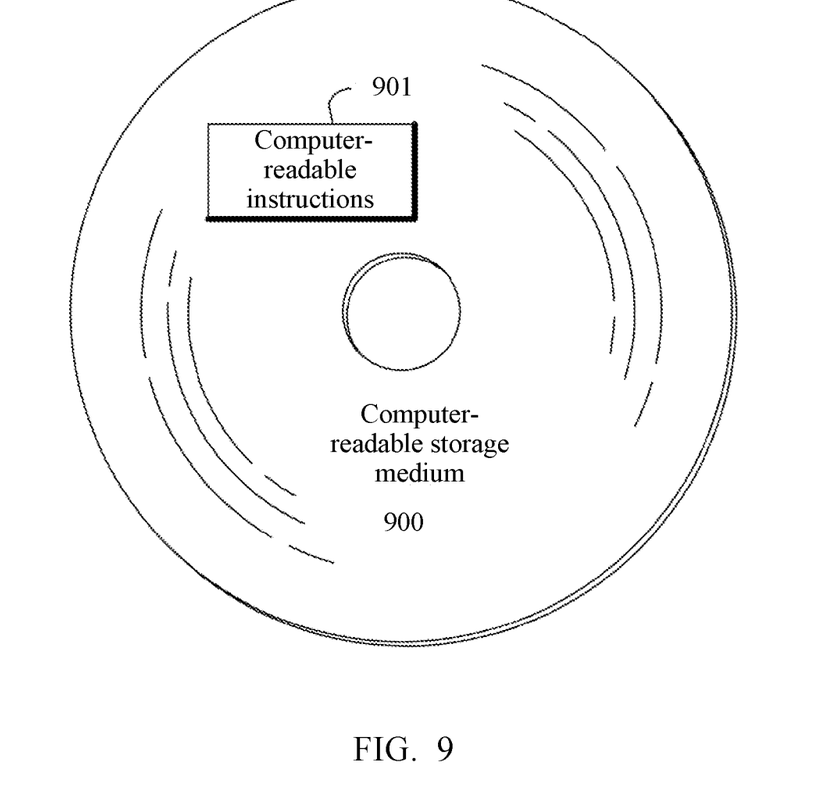
FIG. 9 is a schematic diagram illustrating a computer-readable storage medium according to an embodiment of the present disclosure.

FIG. 9 is a diagram illustrating a computer-readable storage medium according to an embodiment of the present disclosure. As shown in FIG. 9, a computer-readable storage medium 900 according to an embodiment of the present disclosure has computer-readable instructions 901 stored thereon. When the computer readable instructions 901 are executed by a processor, an image processing method according to an embodiment of the present disclosure described with reference to the above drawings is executed.

According to an embodiment of the present disclosure, a computer program is further provided. The computer program may be stored on a cloud or a local storage medium. When the computer program is executed by a computer or a processor, it is configured to execute the respective steps of the image processing method according to an embodiment of the present disclosure, and to implement the corresponding modules in the image processing apparatus according to an embodiment of the present disclosure.

The neural network-based image processing method and apparatus, and the computer-readable storage medium according to the embodiments of the present disclosure have been described above with reference to the accompanying drawings. In the neural network-based image processing method and apparatus according to the present disclosure, channel optimization is performed on the neural network for application scenarios with low power consumption such as mobile devices. The objective of the optimization process according to the embodiments of the present disclosure is to minimize the error on feature reconstruction of each sub-layer, rather than the error on reconstruction of the convolutional kernel, thereby the input feature distribution of each sub-layer and the information of the convolutional kernel itself are considered concurrently. In the optimization process, the two-step optimization algorithm based on sparse least-squares (such as LASSO) is used, each step of the optimization has a mature algorithm that can efficiently achieve the global optimal solution, the overall error of the optimization process is controllable, Stochastic Gradient Descent (SGD) and other instability are avoided. Since sparse coding is used to select the channel, this selection aims at minimizing the reconstruction error, thereby interaction effects of respective channels are fully considered. Further, the optimization process according to an embodiment of the present disclosure is a "test-time approximation" optimization, and the optimization being completed means that the entire process ends, there is no need for retraining. In addition, the optimization process according to an embodiment of the present disclosure achieves automatic and quick determination of a predetermined threshold for the regional optimization process. In addition, the optimization process according to an embodiment of the present disclosure can achieve a corresponding optimal optimization for both a neural network model including multiple paths such as a residual network and a neural network model including a non-linear activation layer such as ReLU.

As will be appreciated by a person of ordinary skill in the art, units and algorithm steps described in combination with the embodiments disclosed herein can be implemented by way of electronic hardware, computer software, or a combination of the two. These functions are to be executed by hardware manner or software manner depending upon the particular application of the technique process and design constraints. A person skilled in the art can use different methods to achieve the described functions with respect to each specific application, but such implementation should not be construed as going beyond the scope of the present disclosure.

Basic principles of the present disclosure have been described above in connection with specific embodiments, but it is to be noted that the merits, advantages, effects etc. mentioned in the present disclosure are merely illustrative, not restrictive, and these merits, advantages, effects etc. cannot be considered as must be provided by respective embodiments of the present disclosure. In addition, specific details disclosed in the above are for illustrative purposes only and are intended to facilitate understanding, not restrictive, and the foregoing details are not to be construed as limiting that the present disclosure must be implemented with the forgoing specific details.

Block diagrams of the device, apparatus, equipment, system involved in the present disclosure are by way of example only and are not intended to request or imply that connection, arrangement, and configuration must be performed in the manner shown in the block diagrams. As will be appreciated by a person skilled in the art, such device, apparatus, equipment, system may be connected, arranged, and configured in any manner. Words such as "including", "comprising", "having" and the like are open words that refer to "including but not limited to", they can be used interchangeably. Words "or" and "and" used here refer to "and/or", they can be used interchangeably, unless the context clearly dictates otherwise. The word "such as" used here refers to "such as but not limited to", and they may be used interchangeably.

In addition, as used herein, "or" contained in item enumeration starting with the term "at least one" refers to separated enumeration, for example, an enumeration of "at least one of A, B or C" means A or B or C, or AB or AC or BC, or ABC (i.e., A and B and C). In addition, the phrase "exemplary" does not mean that the described example is preferred or better than other examples.

It is also to be noted that, in the system and method of the present disclosure, components or steps may be decomposed and/or recombined. These decomposition and/or recombination shall be considered as equivalent solutions of the present disclosure.

Various changes, substitutions and alterations can be made herein without departing from the technology of the teachings as defined by the appended claims. Moreover, the scope of the present disclosure is not intended to be limited to the particular aspects of the process, machine, manufacture, composition of matter, means, methods and steps described in the specification. As a person of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

The preceding description of the disclosed aspects is provided to enable a person skilled in the art to make or use the present disclosure. Various modifications to these aspects will be readily apparent to a person skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

The foregoing description has been presented for purposes of illustration and description. Furthermore, the description is not intended to limit embodiments of the present disclosure to the form disclosed herein. Although a number of exemplary aspects and embodiments have been discussed above, a person of skill in the art will recognize certain variations, modifications, permutations, additions, and sub-combinations thereof.

What is claimed is:

1. An image processing method, comprising:
   inputting an image into an optimized neural network;
   extracting, by the optimized neural network, image features of the image; and
   outputting the image features,
   wherein the optimized neural network is obtained by performing a first optimization process on at least one sub-layer in a pre-trained initial neural network, each sub-layer of the at least one sub-layer includes a convolutional layer, and the first optimization process comprises:
   for each sub-layer of the at least one sub-layer,
      determining one or more channels to be removed from a filter of the convolutional layer and removing said one or more channels, and optimizing parameters of remaining channels in the filter of the convolutional layer, so that error of output features of each optimized sub-layer is minimized.

2. The image processing method as claimed in claim 1, wherein the optimized neural network is obtained by performing the first optimization process on the at least one sub-layer in the initial neural network and performing a second optimization process on a previous sub-layer of each sub-layer of the at least one sub-layer, the second optimization process comprises:

removing one or more filters corresponding to the removed one or more channels from the previous sub-layer of each sub-layer.

3. The image processing method as claimed in claim 1, wherein determining one or more channels to be removed from a filter of the convolutional layer and removing said one or more channels, and optimizing parameters of remaining channels in the filter of the convolutional layer, so that error of output features of each optimized sub-layer is minimized comprises:

selecting the one or more channels to be removed from the filter of the convolutional layer by using the following Expression (1) and optimizing parameters of the remaining channels, $$\operatorname*{argmin}_{\beta,W} \frac{1}{2N} \left\| Y - \sum_{i=1}^{c} \beta_i X_i W_i^T \right\|_F^2 \quad \text{Expression (1)}$$
$$\|\beta\|_0 \leq c'$$

where N represents the number of samples for optimization, Y represents original output features of each sub-layer of the at least one sub-layer, and c represents the number of original channels for input features of each sub-layer of the at least one sub-layer, c' represents a predetermined threshold, $\beta$ represents a mask vector for channel removing, $X_i$ represents an input feature on an i-th channel, and $W_i$ represents a parameter of the i-th channel in the filter.

4. The image processing method as claimed in claim 1, wherein determining one or more channels to be removed from a filter of the convolutional layer and removing said one or more channels, and optimizing parameters of remaining channels in the filter of the convolutional layer, so that error of output features of each optimized sub-layer is minimized comprises:

determining the one or more channels to be removed from the filter of the convolutional layer based on the sparse least squares and removing said one or more channels; and optimizing parameters of remaining channels in the filter of the convolutional layer by using the least squares, so that error of output features of each optimized sub-layer is minimized.

5. The image processing method as claimed in claim 4, wherein determining the one or more channels to be removed from the filter of the convolutional layer based on the sparse least squares and removing said one or more channels comprises:

selecting the one or more channels to be removed from the filter of each convolutional layer by using the following Expression (2)', $$\hat{\beta}^{LASSO}(\lambda) = \operatorname*{argmin}_{\beta} \frac{1}{2N} \left\| Y - \sum_{i=1}^{c} \beta_i Z_i \right\|_F^2 + \lambda \|\beta\|_1 \quad \text{Expression (2)}'$$
$$\|\beta\|_0 \leq c'$$

optimizing parameters of remaining channels in the filter of the convolutional layer by using the least squares, so that error of output features of each optimized sub-layer is minimized comprises:

optimizing parameters of remaining channels in the filter of each convolutional layer by using the following Expression (3)', $$\operatorname*{argmin}_{W'} \|Y - X'(W')^T\|_F^2 \quad \text{Expression (3)}'$$

where N represents the number of samples for optimization, Y represents original output features of each sub-layer of the at least one sub-layer, c represents the number of original channels for input features of each sub-layer of the at least one sub-layer, c' represents a predetermined threshold, $\beta$ represents a mask vector for channel removing, $X_i$ represents an input feature on an i-th channel, $W_i$ represents a parameter of the i-th channel in the filter, and $\lambda$ represents a penalty coefficient of the mask vector for channel removing, X'= $[\beta_1 X_1 \ \beta_2 X_2 \ \ldots \ \beta_i X_i \ \ldots \ \beta_c X_c]_i$ W'=$[W_1 \ W_2 \ \ldots \ W_i \ \ldots \ W_c]_i$ $Z_i = X_i W_i^T$.

6. The image processing method as claimed in claim 1, wherein the optimized neural network is obtained by performing the first optimization process on a plurality of sub-layers in the initial neural network, and the error is obtained by performing computation according to original output features of the convolutional layer and output features of the optimized convolutional layer.

7. The image processing method as claimed in claim 6, wherein performing the first optimization process on a plurality of sub-layers in the initial neural network so that error of optimized output features and original output features of the plurality of sub-layers in the initial neural network is minimized may be expressed as satisfying the following Expression (4):

$$\operatorname*{argmin}_{\beta,W} \frac{1}{2N} \left\| Y' - \sum_{i=1}^{c} \beta_i X_i W_i^T \right\|_F^2 \quad \text{Expression (4)}$$
$$\|\beta\|_0 \leq c'$$

where N represents the number of samples for optimization, Y' represents a matrix of original output features of each sub-layer of the plurality of sub-layers, c represents the number of original channels for input features of each sub-layer of the plurality of sub-layers, c' represents a predetermined threshold, $\beta$ represents a mask vector for channel removing, $X_i$ represents an input feature on an i-th channel, and $W_i$ represents a parameter of the i-th channel in the filter, wherein the one or more channels to be removed from the filter of each sub-layer of the plurality of sub-layers are determined by determining the $\beta$ satisfying Expression (4).

8. The image processing method as claimed in claim 1, wherein the initial neural network is a multi-path neural network that includes at least one computation block, each computation block includes a first path and a second path, the first path includes a plurality of convolutional layers cascaded, the second path is a path for linking input features of a first convolutional layer in the first path and output features of a last convolutional layer in the first path, the at least one sub-layer is a convolutional layer other than the first convolutional layer and the last convolutional layer in each computation block in the multi-path neural network.

9. The image processing method as claimed in claim 8, wherein the optimized neural network is obtained by performing the first optimization process on the at least one sub-layer in the multi-path neural network, and setting a sampler before a first convolutional layer of each computation block, the sampler is used to sample input features of each computation block to filter channels for input features of the first convolutional layer.

10. The image processing method as claimed in claim 8, wherein the optimized neural network is obtained by performing the first optimization process on the at least one sub-layer in the multi-path neural network and performing a third optimization process on a last convolutional layer of each computation block, the third optimization process comprises:

determining the one or more channels to be removed from the filter of the last convolutional layer and removing said one or more channels, and optimizing parameters of remaining channels in the filter of the last convolutional layer, so that error of output features of each computation block is minimized.

11. The image processing method as claimed in claim 2, further comprising:

collecting and updating status information of the neural network;

generating a plurality of candidate values;

optimizing the neural network to determine speed-up ratios and accuracy for optimization corresponding to the plurality of candidate values; and selecting a candidate value having the optimal acceleration ratio and accuracy for optimization from among the plurality of candidate values as the predetermined threshold.

12. The image processing method as claimed in claim 1, wherein said each sub-layer further includes a non-linear activation layer connected behind the convolutional layer, and the first optimization process comprises:

for each sub-layer of the at least one sub-layer,
determining the one or more channels to be removed from the filter of the convolutional layer and removing said one or more channels, and optimizing parameters of remaining channels in the filter of the convolutional layer, so that error of output features of the non-linear activation layer of each sub-layer optimized is minimized.

13. The image processing method as claimed in claim 12, wherein error of output features of the non-linear activation layer of each sub-layer optimized being minimized comprises:

selecting the one or more channels to be removed from the filter of each convolutional layer by using the following Expression (5), $$\underset{\beta,W}{\operatorname{argmin}} \frac{1}{2N} \left\| f(Y) - f\left( \sum_{i=1}^{c} \beta_i X_i W_i^T \right) \right\|_F^2 \quad \text{Expression (5)}$$

$$\|\beta\|_0 \le c'$$

where N represents the number of samples for optimization, Y represents original output features of said each sub-layer, c represents the number of original channels for input features of said each sub-layer, c' represents a predetermined threshold, $\beta$ represents a mask vector for channel removing, $X_i$ represents an input feature on an i-th channel, $W_i$ represents a parameter of the i-th channel in the filter, and $f$ represents a non-linear activation function.

14. The image processing method as claimed in claim 13, wherein solving Expression (5) is equivalent to solving the following Expression (6):

$$\underset{\beta,W}{\operatorname{argmin}} \frac{1}{2N} \delta \left\| U - \sum_{i=1}^{c} \beta_i X_i W_i^T \right\|_F^2 + \lambda \|\beta\|_1 \quad \text{Expression (6)}$$

$$\|\beta\|_0 \le c', \forall i \|W_i\|_F = 1$$

where $U = \sum_{i=1}^{c} \beta_i X_i W_i^T$, Expression (6) containing no non-linear activation function is solved by fixing U, the one or more channels to be removed from the filter of each convolutional layer are determined by determining the $\beta$ that satisfies Expression (6).

15. The image processing method as claimed in claim 13, wherein solving Expression (5) is equivalent to solving the following Expression (7):

$$\underset{U}{\operatorname{argmin}} \|f(Y) - f(U)\|_F^2 + \delta \|U - V\|_F^2 \quad \text{Expression (7)}$$

$$V = \sum_{i=1}^{c} \beta_i X_i W_i^T$$

where $U = \sum_{i=1}^{c} \beta_i X_i W_i^T$, and U is solved by fixing $\beta$ and W.

16. An image processing apparatus, comprising:

a memory for storing computer-readable instructions; and a processor for executing the computer-readable instructions to cause the image processing apparatus to perform an image processing method, said method comprising:

inputting an image into an optimized neural network;

extracting, by the optimized neural network, image features of the image; and outputting the image features, wherein the optimized neural network is obtained by performing a first optimization process on at least one sub-layer in a pre-trained initial neural network, each sub-layer of the at least one sub-layer includes a convolutional layer, and the first optimization process comprises:

for each sub-layer of the at least one sub-layer,
determining one or more channels to be removed from a filter of the convolutional layer and removing said one or more channels, and optimizing parameters of remaining channels in the filter of the convolutional layer, so that error of output features of each optimized sub-layer is minimized.

17. The image processing apparatus as claimed in claim 16, wherein the optimized neural network is obtained by performing the first optimization process on the at least one sub-layer in the initial neural network and performing a second optimization process on a previous sub-layer of each sub-layer of the at least one sub-layer, the second optimization process comprises:
   removing one or more filters corresponding to the removed one or more channels from the previous sub-layer of each sub-layer.

18. A computer-readable non-transitory storage medium for storing computer-readable instructions capable of, when being executed by a computer, causing the computer to perform an image processing method comprising:
   inputting an image into an optimized neural network;
   extracting, by the optimized neural network, image features of the image; and
   outputting the image features,
   wherein the optimized neural network is obtained by performing a first optimization process on at least one sub-layer in a pre-trained initial neural network, each sub-layer of the at least one sub-layer includes a convolutional layer, and the first optimization process comprises:
   for each sub-layer of the at least one sub-layer,
      determining one or more channels to be removed from a filter of the convolutional layer and removing said one or more channels, and optimizing parameters of remaining channels in the filter of the convolutional layer, so that error of output features of each optimized sub-layer is minimized.

19. The computer readable non-transitory storage medium as claimed in claim 18, wherein the optimized neural network is obtained by performing the first optimization process on the at least one sub-layer in the initial neural network and performing a second optimization process on a previous sub-layer of each sub-layer of the at least one sub-layer, the second optimization process comprises:
   removing one or more filters corresponding to the removed one or more channels from the previous sub-layer of each sub-layer.

* * * * *